United States Patent
Mascarenhas et al.

(10) Patent No.: US 12,028,351 B2
(45) Date of Patent: Jul. 2, 2024

(54) PROTECTING AGAINST API ATTACKS BY CONTINUOUS AUDITING OF SECURITY COMPLIANCE OF API USAGE RELATIONSHIP

(71) Applicant: International Business Machines Corporation, Armonk, NY (US)

(72) Inventors: Lloyd Wellington Mascarenhas, White Plains, NY (US); Matthias Seul, Pleasant Hill, CA (US); Arielle Tovah Orazio, Wood-Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 17/526,087

(22) Filed: Nov. 15, 2021

(65) Prior Publication Data
US 2023/0156016 A1    May 18, 2023

(51) Int. Cl.
H04L 9/40    (2022.01)
(52) U.S. Cl.
CPC .......... H04L 63/1408 (2013.01); H04L 63/10 (2013.01); H04L 63/1441 (2013.01)
(58) Field of Classification Search
CPC . H04L 63/1408; H04L 63/10; H04L 63/1441; H04L 63/0823; H04L 63/1425; H04L 63/1433
See application file for complete search history.

(56) References Cited

U.S. PATENT DOCUMENTS 10,492,072 B1 *  11/2019  Sokolov ............... H04L 67/12
10,511,637 B2    12/2019  DiCorpo et al.
(Continued)

FOREIGN PATENT DOCUMENTS

CN    107409126 A    11/2017
CN    111683107 A     9/2020
(Continued)

OTHER PUBLICATIONS

Kawakoya et al., "API Chaser: Taint-Assisted Sandbox for Evasive Malware Analysis," Journal of Information Processing, vol. 27, Mar. 2019, pp. 297-314.
(Continued)

*Primary Examiner* — Ali S Abyaneh
(74) *Attorney, Agent, or Firm* — Shackelford, McKinley & Norton, LLP; Robert A. Voigt, Jr.

(57) ABSTRACT

A computer-implemented method, system and computer program product for protecting against application programming interface (API) attacks. A connection is established between an API user and an API provider. The established connection is then monitored to assess connection security and trustworthiness of the connection as well as trustworthiness of the API user and/or API provider. A score is then generated for each factor used in assessing the connection security and trustworthiness of the connection as well as the trustworthiness of the API user and/or API provider based on the monitoring. A level of risk for an API attack with respect to the API user and/or API provider is then generated based on such scores. An action (e.g., blocking traffic) is then performed with respect to the API user and/or API provider based on the level of risk for an API attack with respect to the API user and/or API provider, respectively.

20 Claims, 6 Drawing Sheets

(56) References Cited

U.S. PATENT DOCUMENTS

| | | | |
|---|---|---|---|
| 10,740,164 B1 | 8/2020 | Roy et al. | |
| 10,757,139 B1* | 8/2020 | Cignetti | H04L 63/1433 |
| 2015/0215332 A1* | 7/2015 | Curcic | H04L 63/20 |
| | | | 726/25 |
| 2017/0230402 A1* | 8/2017 | Greenspan | H04W 12/08 |
| 2017/0329966 A1 | 11/2017 | Koganti et al. | |
| 2019/0334943 A1* | 10/2019 | Arvanites | H04W 4/023 |
| 2020/0287888 A1* | 9/2020 | Moore | H04L 63/0892 |
| 2020/0304503 A1 | 9/2020 | Zerrad et al. | |

FOREIGN PATENT DOCUMENTS

| | | |
|---|---|---|
| EP | 2972822 B1 | 1/2016 |
| GB | 2573255 A | 10/2019 |
| KR | 102088297 B1 | 3/2020 |

OTHER PUBLICATIONS

Appala et al., "An Actionable Threat Intelligence System Using a Publish-Subscribe Communications Model," Proceedings of the 2nd ACM Workshop on Information Sharing and Collaborative Security, Denver, Colorado, U.S.A., Oct. 12, 2015, pp. 61-70.
International Search Report and Written Opinion of the International Searching Authority for International Application No. PCT/CN2022/129581 dated Jan. 18, 2023, pp. 1-9.

* cited by examiner

| MONITORED FACTORS | API USER | API PROVIDER |
|---|---|---|
| CONNECTION SUSCEPTIBLE TO REPLAY ATTACK | 3.1 MEDIUM | 5 MEDIUM |
| CONNECTION HTTPS ENABLED | 2 LOW | 2 LOW |
| LEAKED CONTENT DISCOVERED | 5 MEDIUM | 6 HIGH |
| ACTIVE RECALLS FOR THE CERTIFICATE | 1 LOW | 1 LOW |
| ENCRYPTION DOWNGRADE ACCEPTED | 5 MEDIUM | 7 HIGH |
| CERTIFICATE PINNING IMPLEMENTED | 0 LOW | 0 LOW |
| CONNECTION UTILIZES SANCTIONED IP ADDRESSES | 4 MEDIUM | 5 MEDIUM |
| FINAL LEVEL OF RISK | MEDIUM (4M, 3L) | EXTREME (2H) |

FIG. 5

PROTECTING AGAINST API ATTACKS BY CONTINUOUS AUDITING OF SECURITY COMPLIANCE OF API USAGE RELATIONSHIP

TECHNICAL FIELD

The present disclosure relates generally to application programming interface (API) attacks, and more particularly to protecting against API attacks by the continuous auditing of the security compliance of the API usage relationship, such as between the API user and the API provider.

BACKGROUND

An application programming interface (API) is a connection between computers or between computer programs. It is a type of software interface, offering a service to other pieces of software. It is not intended to be used directly by a person (the end user) other than a computer programmer who is incorporating it into software. An API is often made up of different parts which act as tools or services that are available to the programmer. A program or a programmer that uses one of these parts is said to call that portion of the API. The calls that make up the API are also known as subroutines, methods, requests, or endpoints. An API specification defines these calls. That is, the API specification explains how to use or implement these calls.

Unfortunately, APIs are susceptible to different types of attacks. An API attack is a hostile usage or attempted hostile usage of an API. There are various ways that attackers can abuse an API endpoint, such as injection attacks, denial of service attacks, man in the middle attacks, etc. An "API abuse," as used herein, refers to the misuse of API functions to either carry out malicious activities (e.g., using the API to raid servers) or to send numerous requests to a computing device (e.g., server) to waste bandwidth.

SUMMARY

In one embodiment of the present disclosure, a computer-implemented method for protecting against application programming interface (API) attacks comprises establishing a connection between an API user and an API provider. The method further comprises monitoring the connection to assess connection security and trustworthiness of the connection as well as trustworthiness of the API user and/or the API provider. The method additionally comprises generating a score for each factor used in assessing the connection security and the trustworthiness of the connection as well as the trustworthiness of the API user and/or the API provider based on the monitoring to indicate connection insecurity, untrustworthiness of the connection, untrustworthiness of the API user or untrustworthiness of the API provider. Furthermore, the method comprises generating a level of risk for an API attack with respect to the API user and/or the API provider based on the generated score for each factor used in assessing the connection security and the trustworthiness of the connection as well as the trustworthiness of the API user and/or the API provider. Additionally, the method comprises performing an action with respect to the API user and/or the API provider based on the level of risk for the API attack with respect to the API user and/or the API provider, respectively.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 is an exemplary illustration of compiling the findings from various monitored aspects concerning the risk for an API attack in accordance with an embodiment of the present disclosure.

DETAILED DESCRIPTION

Figure 1:
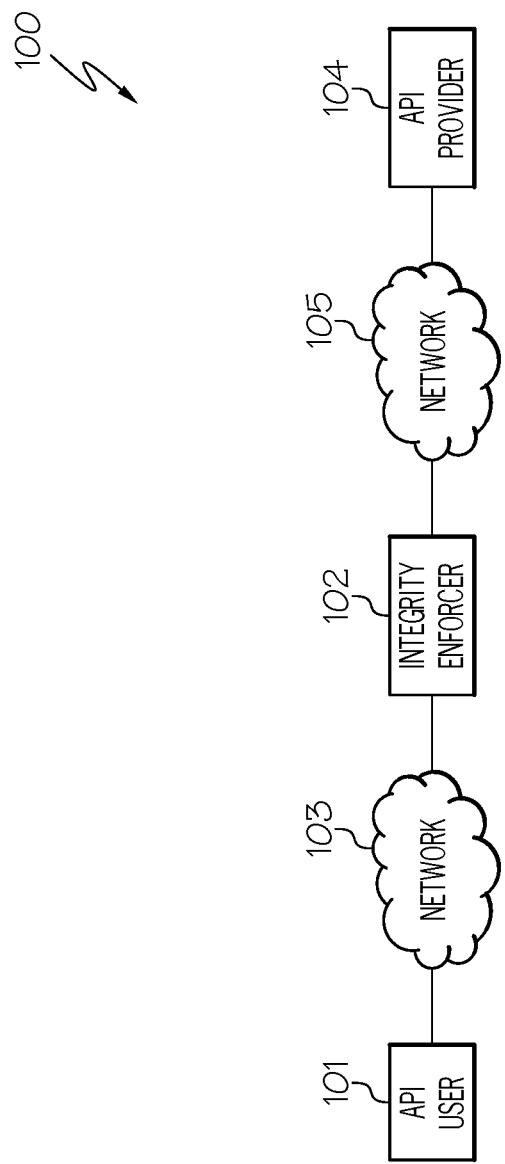
FIG. 1 illustrates a communication system for practicing the principles of the present disclosure in accordance with an embodiment of the present disclosure.

As stated in the Background section, an application programming interface (API) is a connection between computers or between computer programs. It is a type of software interface, offering a service to other pieces of software. It is not intended to be used directly by a person (the end user) other than a computer programmer who is incorporating it into software. An API is often made up of different parts which act as tools or services that are available to the programmer. A program or a programmer that uses one of these parts is said to call that portion of the API. The calls that make up the API are also known as subroutines, methods, requests, or endpoints. An API specification defines these calls. That is, the API specification explains how to use or implement these calls.

Unfortunately, APIs are susceptible to different types of attacks. An API attack is a hostile usage or attempted hostile usage of an API. There are various ways that attackers can abuse an API endpoint, such as injection attacks, denial of service attacks, man in the middle attacks, etc. An "API abuse," as used herein, refers to the misuse of API functions to either carry out malicious activities (e.g., using the API to raid servers) or to send numerous requests to a computing device (e.g., server) to waste bandwidth.

With respect to the exemplary API attacks listed above, injection attacks occur when malicious code is embedded into unsecured software. In a denial of service (DoS) attack, the attacker attempts to make the targeted system unavailable to its intended users. In the API man in the middle attack, the attacker intercepts communications between an API endpoint and a client. The attacker steals and/or alters the confidential data that is passed between them.

Attempts have been made to detect and protect against such API attacks, such as having APIs enforce authentication and authorization, encrypting traffic using transport layer security (TLS), removing information that is not meant to be shared, etc. Unfortunately, such attempts have failed to detect and protect against such API attacks.

The embodiments of the present disclosure provide a means for detecting and protecting against API attacks (e.g., injection attacks, denial of services attacks, man in the middle attacks, etc.) by continuously auditing the security compliance of the API usage relationship between the API user and the API provider. Such auditing (or examination) of the security compliance of the API usage relationship involves the following services: compliance auditing, breach detection and trusting monitoring. A discussions of these and other features is provided further below.

Furthermore, in one embodiment, such auditing is bi-directional in that both directions of the entities (API users and API providers) are audited. Furthermore, in one embodiment, such auditing may occur even if neither entity is actively supporting such auditing.

In one embodiment, such auditing of the present disclosure is a drop-in addition which can be operated by a third-party assurance organization that can certify the trust level between the involved entities. Furthermore, as a drop-in addition, it relies on a mixture of passive and active monitoring within the protocols' limits looking for divergent behavior without resorting to fuzzing (automatic bug detection), disruptive intervention, etc.

In some embodiments of the present disclosure, the present disclosure comprises a computer-implemented method, system and computer program product for protecting against application programming interface (API) attacks. In one embodiment of the present disclosure, a connection is established between an API user and an API provider. The established connection is then monitored in real-time to assess connection security and trustworthiness of the connection as well as the trustworthiness of the API user and/or the API provider. A score is then generated for each factor (e.g., determining whether the connection has a minimum transport layer security standard enforced, determining whether an encryption downgrade is accepted) used in assessing the connection security and the trustworthiness of the connection as well as the trustworthiness of the API user and/or the API provider based on the monitoring to indicate connection insecurity, untrustworthiness of the connection, untrustworthiness of the API user or untrustworthiness of the API provider. The score assigned to each these factors is then compared to a predefined threshold value to identify a risk level for an API attack with respect to the API user or the API provider. For example, the score assigned to a factor may be compared to a predefined threshold value, which may represent different levels of risk, such as, for example, low, medium, high and extreme levels of risk. A "final" level of risk for an API attack with respect to the API user and/or the API provider is then generated based on these identified levels of risk for an API attack for each of these factors. An action (e.g., blocking traffic, throttling traffic) is then performed with respect to the API user and/or the API provider based on the final level of risk for an API attack with respect to the API user and/or the API provider, respectively. In this manner, embodiments of the present disclosure detect and protect against API attacks (e.g., injection attacks, denial of services attacks, man in the middle attacks, etc.) by continuously auditing the security compliance of the API usage relationship between the API user and the API provider.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes an application programming interface (API) user 101 connected to integrity enforcer 102 via a network 103. Furthermore, as shown in FIG. 1, API provider 104 is connected to integrity enforcer 102 via a network 105.

API user 101, as used herein, refers to a computing device of the end user that utilizes applications, websites, etc. that use APIs in the background, such as the APIs created by API provider 104.

The computing device of such an end user may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices and integrity enforcer 102. It is noted that both the computing device of the end user and the end user may be identified with element number 101.

API provider 104, as used herein, refers to the computing device of an entity (e.g., software developer, company) that builds, exposes and operates APIs. That is, API provider 104 provides the APIs to others.

The computing device of such an entity may be any type of computing device configured with the capability of connecting to network 105 and consequently communicating with integrity enforcer 102. It is noted that both the computing device of the entity and the entity may be identified with element number 104.

Networks 103, 105 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

While FIG. 1 illustrates two separate networks 103, 105, it is noted that a single network or more than two networks may be utilized to interconnect API user 101 and API provider 104 with integrity enforcer 102.

In one embodiment, integrity enforcer 102 is configured to detect and protect against API attacks (e.g., injection attacks, denial of services attacks, man in the middle attacks, etc.) by continuously auditing the security compliance of the API usage relationship between API user 101 and API provider 104. Such auditing (or examination) of the security compliance of the API usage relationship involves the following services: compliance auditing, breach detection and trusting monitoring. A discussions of these and other features is provided further below.

In one embodiment, integrity enforcer 102 establishes a connection between API user 101 and API provider 104. The connection is then monitored in real-time by integrity enforcer 102 to assess the connection security as well as the trustworthiness of the connection and the trustworthiness of API user 101 and/or API provider 104. After such an assessment, integrity enforcer 102 generates a score indicating a level of risk of an API attack. An appropriate action is then performed by integrity enforcer 102 based on the level of risk of the API attack. An example of such an action includes visually displaying an indication of a level of risk of the API attack. Another example of an appropriate action includes an automatic intervention performed by integrity enforcer 102. In one embodiment, such intervention may include blocking traffic or the throttling of the traffic.

A description of the software components of integrity enforcer 102 used for detecting and protecting against API attacks (e.g., injection attacks, denial of services attacks, man in the middle attacks, etc.) by continuously auditing the security compliance of the API usage relationship between API user 101 and API provider 104 is provided below in connection with FIG. 2. A description of the hardware configuration of integrity enforcer 102 is provided further below in connection with FIG. 3.

System 100 is not to be limited in scope to any one particular network architecture. System 100 may include any number of API users 101, integrity enforcers 102, networks 103, 105 and API providers 104.

A discussion regarding the software components used by integrity enforcer 102 to detect and protect against API attacks (e.g., injection attacks, denial of services attacks, man in the middle attacks, etc.) by continuously auditing the security compliance of the API usage relationship between API user 101 and API provider 104 is provided below in connection with FIG. 2.

Figure 2:
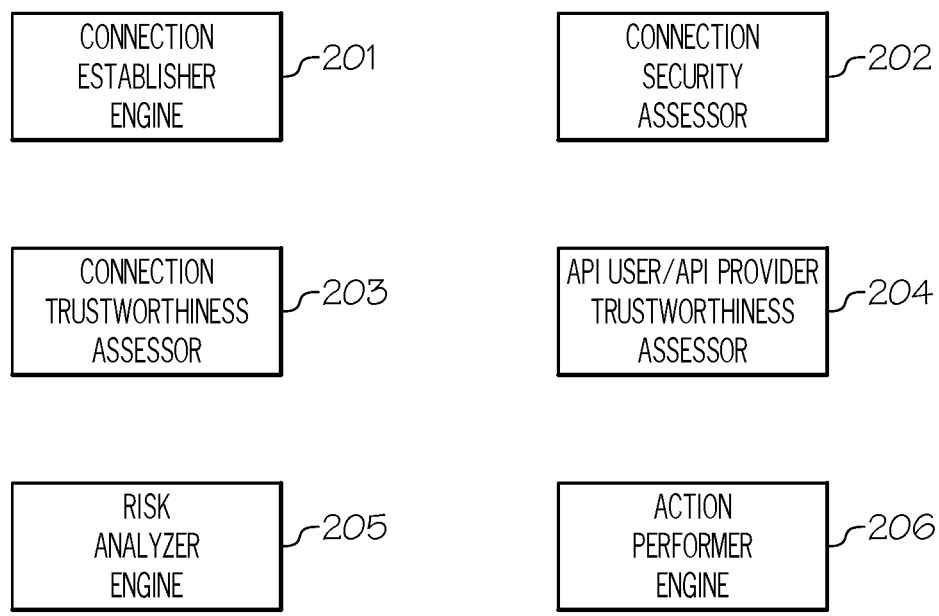
FIG. 2 is a diagram of the software components used by the integrity enforcer to detect and protect against API attacks by continuously auditing the security compliance of the API usage relationship between the API user and the API provider in accordance with an embodiment of the present disclosure.

FIG. 2 is a diagram of the software components used by integrity enforcer 102 to detect and protect against API attacks (e.g., injection attacks, denial of services attacks, man in the middle attacks, etc.) by continuously auditing the security compliance of the API usage relationship between API provider 104 and API user 101 in accordance with an embodiment of the present disclosure.

Referring to FIG. 2, in conjunction with FIG. 1, integrity enforcer 102 includes a connection establisher engine 201 configured to establish a connection between API user 101 and API provider 104.

In one embodiment, connection establisher engine 201 establishes such a connection by obtaining an API key, which is a unique identifier used to authenticate API user 101. In one embodiment, connection establisher engine 201 obtains such an API key from API provider 104. In one embodiment, the API key includes a string of letters and numbers that identify API user 101. A request to establish a connection between API provider 104 and API user 101 is then sent by connection establisher engine 201 to the endpoint of API provider 104 along with the API key to authenticate the request. In one embodiment, the API key is stored in the header of the request. An "endpoint," as used herein, refers to one end of a communication channel.

In one embodiment, upon authentication, API provider 104 enables a connection to be established by connection establisher engine 201 between API provider 104 (endpoint of API provider 104) and API user 101 (endpoint of API user 101).

Integrity enforcer 102 further includes a connection security assessor 202, a connection trustworthiness assessor 203 and an API user/API provider trustworthiness assessor 204 to monitor the established connection between API user 101 and API provider 104 in real-time to assess the connection security and the trustworthiness of the connection as well as the trustworthiness of API user 101 and/or API provider 104.

"Connection security," as used herein, refers to the securing of information sent between API user 101 and API provider 104 over the established connection. "Trustworthiness," as used herein, refers to an attribute of the established connection, API user 101 or API provider 104 that provides confidence that such connections, API users 101 or API providers 104 have the capabilities and reliability to perform specific tasks and fulfill assigned responsibilities, such as the connection being able to property transmit information between API user 101 and API provider 104 and API user 101/API provider 104 being able to properly send or receive information transmitted over the established connection.

In one embodiment, connection security assessor 202 monitors the established connection between API user 101 and API provider 104 to assess the connection security, such as by determining whether the connection has a minimum transport layer security standard enforced. For example, connection security assessor 202 may determine if the Internet option of a particular transport layer security (e.g., TLS 1.2) is enabled. If such an option is not enabled, then the established connection may lack connection security.

In another example, connection security assessor 202 assesses the connection security by determining whether a session is valid after a session timeout. For example, a session timeout may be determined by connection security assessor 202 examining the session timeout property, which indicates a period of time in which if there are no requests during such a period of time, such as from API user 101, then the session should be expired. Once the session is expired, the session should not be valid. As a result, if connection security assessor 202 determines that the established connection is still valid after it should have been expired, then the established connection may lack connection security.

In a further example, connection security assessor 202 assesses the connection security by determining whether the security handling of session cookies is proper. For example, connection security assessor 202 determines whether the session cookie only contains the session identifier or contains other information, which may include confidential information, which may be targeted by hackers. As a result, if the session cookie includes more than the session identifier, then the established connection may be deemed to lack connection security.

In another example, connection security assessor 202 assesses the connection security by determining whether the security handling of parameters is proper. For example, connection security assessor 202 determines whether usernames, passwords and other security identifiers are stored in the unencrypted parameters. In such a scenario, the established connection may be deemed to lack connection security.

In a further example, connection security assessor 202 assesses the connection security by determining whether the established connection utilizes sanctioned Internet Protocol (IP) addresses, such as a list of IP addresses provided by a government entity that are associated with individuals or a country that are to be blocked from performing online transactions or access. In one embodiment, connection security assessor 202 obtains the IP address of the API user 101/API provider 104 and compares such an IP address with a list of sanctioned IP addresses. If there is a match, then the established connection may be deemed to lack connection security.

In another example, connection security assessor 202 assesses the connection security by determining whether API user 101 or API provider 104 is located within a user-designated geographic area. For example, a data structure (e.g., table) may contain a listing of geographic areas in which online transactions or access is to be prohibited. In one embodiment, such a data structure is populated by an expert. In one embodiment, such a data structure is stored in a storage device (e.g., memory, disk unit) of integrity enforcer 102. In one embodiment, the geographic area of the location of API user 101 or API provider 104 is determined by connection security assessor 202 based on the IP address of API user 101 or API provider 104. In one embodiment, connection security assessor 202 accesses the ARIN (American Registry for Internet Numbers) database for finding contact and registration information for registered IP resources, such as the IP address space. Such a database many include geographic location information based on the IP address. In another embodiment, connection security assessor 202 utilizes a third party website (e.g., Geobytes) to lookup the IP address of API user 101 or API provider 104, which may indicate the owner of the IP address as well as the geographic location of the origin of the IP address. In this manner, connection security assessor 202 determines the geographic area of the location of API user 101 or API provider 104. In another embodiment, connection security assessor 202 performs a reverse DNS (Domain Name System) to find out the hostname of the IP address of API user 101 or API provider 104, which may be used to identify a geographic location. In one embodiment, after connection security assessor 202 obtains the geographic location of the IP address of API user 101 or API provider 104, connection security assessor 202 compares such a geographic location with the list of geographic areas in which online transactions or access is to be prohibited. If there is a match, then the established connection may be deemed to lack connection security.

In a further example, connection security assessor 202 assesses the connection security by determining whether the connection to API user 101/API provider 104 is hosted by a user-designated platform provider. In one embodiment, a data structure (e.g., table) may contain a listing of platform providers in which online transactions or access to such providers is to be prohibited. In one embodiment, such a data structure is populated by an expert. In one embodiment, such a data structure is stored in a storage device (e.g., memory, disk unit) of integrity enforcer 102. In one embodiment, connection security assessor 202 determines the host provider by performing a lookup at a WHOIS website which provides the name of a host provider after entering the domain name of API user 101 or API provider 104. In one embodiment, after connection security assessor 202 obtains the host provider of API user 101 or API provider 104, connection security assessor 202 compares such a host provider with a list of host providers in which online transactions or access is to be prohibited. If there is a match, then the established connection may be deemed to lack connection security.

In another example, connection security assessor 202 assesses the connection security by determining whether the connection is hypertext transfer protocol (HTTPS) enabled. For example, connection security assessor 202 may determine if the Internet option of HTTPS is enabled. If such an option is not enabled, then the established connection may lack connection security.

In a further example, connection security assessor 202 assesses the connection security by determining whether the certificate (electronic credentials that bind the identity of the certificate owner to a pair of electronic encryption keys, (one public and one private), that can be used to encrypt and sign information digitally) used in establishing a trusted relationship between API user 101 and API provider 104 is a trusted non-expired certificate. In one embodiment, connection security assessor 202 utilizes a certification authority (CA) (e.g., SSL.com) to verify the identity of the certificate owner of the certificate, which may be checked against a data structure (e.g. table) containing a list of certificate owners that are deemed to not be trusted. If there is a match, then the established connection may be deemed to lack connection security. In one embodiment, such a data structure is populated by an expert. In one embodiment, such a data structure resides within the storage device (e.g., memory, disk unit) of integrity enforcer 102.

In another embodiment, connection security assessor 202 checks the certificate's revocation status against the certificate revocation lists issued by certificate authorities. If such a certificate is determined to be revoked, then the connection is deemed to not be secured.

In another embodiment, connection security assessor 202 checks the expiration date of the certificate. If the certificate is expired, then the connection is deemed to not be secured.

In another example, connection security assessor 202 assesses the connection security by determining whether the connection is susceptible to a replay attack, such as a replay of authentication credentials (e.g., password) by not tagging each encrypted component with a session identifier and a component number. If the encrypted component is not tagged with a session identifier and a component number, then the established connection may be deemed to lack connection security.

Connection security assessor 202 monitors the established connection between API user 101 and API provider 104 to assess the connection security, such as via the examples discussed above, using various software tools, including, but not limited to, SolarWinds® Network Insights, Paessler® PRTG, ManageEngine® OpManager, Negios XI, Zenoss®, Icinga® 2, Wireshark®, Network Mapper®, Nessus®, QualysGuard®, Core Impact®, Nikto, PowerSploit, etc.

In another embodiment, a connection may be deemed to be susceptible to a replay attack based on unusual traffic routing or poor quality of service for the established connection. In one embodiment, the "unusualness" or "poorness" is based on a difference of a user-designated degree of traffic routing or quality of service that was previously offered between such API users 101 and API providers 104. In one embodiment, a data structure (e.g., table) is maintained that stores information pertaining to the traffic routing and quality of service between API users 101 and API providers 104. In one embodiment, such a data structure is populated by an expert. In one embodiment, such a data structure is stored in a storage device (e.g., memory, disk unit) of integrity enforcer 102.

In one embodiment, connection security assessor 202 utilizes various software tools for determining the traffic routing and quality of services, including, but not limited to, SolarWinds® Network Insights, Paessler® PRTG, ManageEngine® OpManager, Negios XI, Zenoss®, Icinga® 2, etc. If such traffic routing or quality of service is different by a user-designated degree of traffic routing or quality of service that was previously offered between such API users 101 and API providers 104 (as stored in the data structure discussed above), then the established connection may be deemed to lack connection security.

In a further example, connection security assessor 202 assesses the connection security by verifying that the hosting has been set-up properly by analyzing the S3 buckets (object storage service) using various software tools, such as Access Analyzer for S3. If the hosting has not been set-up properly, then the established connection may be deemed to lack connection security.

The discussion above provided examples of connection security assessor 202 monitoring the established connection between API user 101 and API provider 104 to assess the connection security. In one embodiment, connection security assessor 202 generates a value to indicate a lack of connection security, including the extent or risk of connection insecurity. In one embodiment, such a value may correspond to a value between a range of values, such as between 0 and 10, in which the higher value indicates a higher risk of connection insecurity. In one embodiment, connection security assessor 202 generates a value for each factor (e.g., determining whether a session is valid after a session timeout, determining whether the connection has a minimum transport layer security standard enforced) that was used in assessing the connection security that represents the extent or risk of connection insecurity.

In one embodiment, the value generated by connection security assessor 202 for each factor (e.g., determining whether a session is valid after a session timeout, determining whether the connection has a minimum transport layer security standard enforced) that was used in assessing the connection security is compared to a predefined threshold value, which may represent different levels of risk, such as, for example, low, medium, high and extreme levels of risk. In one embodiment, such predefined levels of threshold are populated by an expert. In one embodiment, the values (generated by connection security assessor 202) of 1-3 correspond to a low level of risk, the values (generated by connection security assessor 202) of 3.1-5 correspond to a medium level of risk, the values (generated by connection security assessor 202) of 5.1-10 correspond to a high level of risk and values (generated by connection security assessor 202) greater than 10 correspond to an extreme level of risk.

In one embodiment, connection trustworthiness assessor 203 monitors the established connection between API user 101 and API provider 104 to assess the trustworthiness of the connection, such as by determining the lifetime remaining on a certificate. For example, connection trustworthiness assessor 203 may determine the certificate's predefined validity period that includes a start date and time and an end date and time. Such an end date may be determined by identifying the expiration date of the certificate using a tool, such as Telegraf. After identifying the end date of the certificate, if the end date has passed or there is less than a threshold amount of lifetime (which may be user-specified) remaining on the certificate, then the established connection may be deemed to not be trustworthy.

In another example, connection trustworthiness assessor 203 assesses the trustworthiness of the connection by determining if there are any active recalls for the certificate. In certain situations, the certificate authority ceases verifying the trustworthiness of the certificate that was previously issued by them (a process referred to as "recalling" the certificate). For example, the certificate authority may recall the certificate if a private key is stolen from a software developer or the company's infrastructure is compromised and a trusted certificate is used to sign a malicious file. In such a scenario, the certificate authority will recall the certificate. In one embodiment, connection trustworthiness assessor 203 determines whether there are any active recalls for the certificate by reviewing a certificate revocation list produced by the certificate authority which includes a list of digital certificates that have been revoked by the certificate authority before their actual or assigned expiration date. If connection trustworthiness assessor 203 identifies an active recall for a certificate, then the established connection (connection between API user 101 and API provider 104 in which the certificate was used to establish a trusted relationship between API user 101 and API provider 104) may be deemed to not be trustworthy.

In a further example, connection trustworthiness assessor 203 assesses the trustworthiness of the connection by determining whether leaked content is discovered. "Leaked content," as used herein, refers to content that was transmitted over the established connection between API user 101 and API provider 104 that was or could possibly be obtained by a third party. In one embodiment, connection trustworthiness assessor 203 discovers leaked content by identifying a copy of the content transmitted over the established connection that was stored on a text storage site, such as pastebin, which is an online content-hosting service where users can store plain text (e.g., source code snippets for code review). In another embodiment, connection trustworthiness assessor 203 discovers leaked content by identifying a copy of the content transmitted over the established connection on a website. For example, connection trustworthiness assessor 203 may check whether private, personal or confidential information transmitted over the established connection has been compromised using the website https://haveibeenpwned.com. In one embodiment, connection trustworthiness assessor 203 monitors the information, such as confidential information, being transmitted over the established connection. Such monitoring may involve storing such information in order to determine whether such content has been leaked. Connection trustworthiness assessor 203 uses various software tools to perform such monitoring, including, but not limited to, SolarWinds® Network Performance Monitor, Datadag® Network Monitoring, ManageEngine® OpManager, Paessler® PRTG Network Monitor, Auvik®, Nagios® XI, Zabbix®, LogicMonitor®, etc.

Connection trustworthiness assessor 203 monitors the established connection between API user 101 and API provider 104 to assess the trustworthiness of the connection, such as via the examples discussed above, using various software tools, including, but not limited to, SolarWinds® Network Performance Monitor, Datadag® Network Monitoring, ManageEngine® OpManager, Paessler® PRTG Network Monitor, Auvik®, Nagios® XI, Zabbix®, LogicMonitor®, OP5®, Splunk®, NetXMS, etc.

The discussion above provided examples of connection trustworthiness assessor 203 monitoring the established connection between API user 101 and API provider 104 to assess the connection trustworthiness. In one embodiment, connection trustworthiness assessor 203 generates a value to indicate a lack of trustworthiness, including the extent or risk of untrustworthiness. In one embodiment, such a value may correspond to a value between a range of values, such as between 0 and 10, in which the higher value indicates a higher risk of connection untrustworthiness. In one embodiment, connection trustworthiness assessor 203 generates a value for each factor (e.g., determining whether leaked content is discovered, determining the lifetime remaining on a certificate) that was used in assessing the connection trustworthiness that represents the extent or risk of connection untrustworthiness.

In one embodiment, the value generated by connection trustworthiness assessor 203 for each factor (e.g., determining whether leaked content is discovered, determining the lifetime remaining on a certificate) that was used in assessing the connection untrustworthiness is compared to a predefined threshold value, which may represent different levels of risk, such as, for example, low, medium, high and extreme levels of risk. In one embodiment, such predefined levels of threshold are populated by an expert. In one embodiment, the values (generated by connection trustworthiness assessor 203) of 1-3 correspond to a low level of risk, the values (generated by connection trustworthiness assessor 203) of 3.1-5 correspond to a medium level of risk, the values (generated by connection trustworthiness assessor 203) of 5.1-10 correspond to a high level of risk and values (generated by connection trustworthiness assessor 203) greater than 10 correspond to an extreme level of risk.

In one embodiment, API user/API provider trustworthiness assessor 204 monitors the established connection between API user 101 and API provider 104 to assess the trustworthiness of API user 101/API provider 104, such as by determining whether certificate pinning is implemented. It is noted that the "/," as used herein, means "or." For example, "API user/API provider" trustworthiness assessor 204 refers to API user or API provider trustworthiness assessor 204. In another example, API user 101/API provider 104 refers to API user 101 or API provider 104.

As discussed above, an example of API user/API provider trustworthiness assessor 204 assessing the trustworthiness of API user 101/API provider 104 is determining whether certificate pinning is implemented. "Certificate pinning," as used herein, refers to a process of associating a host with their expected certificate or public key. Once a certificate or public key is known or seen for a host, the certificate or public key is associated or "pinned" to the host. By having certificate pinning, API user 101/API provider 104 is required to validate the certificate against a known copy. By utilizing certificate pinning, API user 101/API provider 104 may be deemed to be more trustworthy. In contrast, if certificate pinning is not utilized, API user 101/API provider 104 may be deemed to be less trustworthy.

In another example, API user/API provider trustworthiness assessor 204 assesses the trustworthiness of API user 101/API provider 104 by determining whether an encryption downgrade is accepted. An "encryption downgrade," as used herein, refers to using a weaker encryption algorithm thereby making sensitive, personal and confidential information more susceptible to being read by an intruder or interceptor. By having API user 101/API provider 104 accept an encryption downgrade, API user 101/API provider 104 may be deemed to be less trustworthy.

In another example, API user/API provider trustworthiness assessor 204 assesses the trustworthiness of API user 101/API provider 104 by determining whether a connection from a new host is accepted. If API user 101/API provider 104 accepts a connection from a new host, then API user 101/API provider 104 may be deemed to be less trustworthy.

In another example, API user/API provider trustworthiness assessor 204 assesses the trustworthiness of API user 101/API provider 104 by determining whether changes in servers or protocol versions are accepted during the session. A "session," as used herein, refers to a temporary and interactive information interchange between API user 101 and API provider 104. If API user 101/API provider 104 accepts changes in servers or protocol versions during the session, then API user 101/API provider 104 may be deemed to be less trustworthy.

In a further example, API user/API provider trustworthiness assessor 204 assesses the trustworthiness of API user 101/API provider 104 by determining whether the session is properly terminated after timeout. A "session timeout," as used herein, refers to terminating the session after a period of time involving a lack of activity, such as no information being exchanged between API user 101 and API provider 104. A properly terminated session occurs after terminating the session after timeout. An improperly terminated session occurs after terminating the session prior to timeout. If an improperly terminated session occurs, then API user 101/API provider 104 may be deemed to be less trustworthy.

In another example, API user/API provider trustworthiness assessor 204 assesses the trustworthiness of API user 101/API provider 104 by determining changes in business ownership, changes in code ownership, and changes in API specifications, etc. "Changes in business ownership," as used herein, refer to changes in the ownership of API user 101/API provider 104. Such information (changes in business ownership) may be obtained by API user/API provider trustworthiness assessor 204 examining changelogs. In another example, such information may be obtained by API user/API provider trustworthiness assessor 204 examining social media content. In one embodiment, such changelogs and social media content may be stored in publicly available repositories, websites (e.g., social media websites), etc. on the Internet. In one embodiment, changelogs and social media content may be examined by API user/API provider trustworthiness assessor 204 accessing publicly available repositories, websites (e.g., social media websites), etc. on the Internet, which may be accessible via network 103, 105. While such repositories, social media servers (hosting such social media websites), etc. are not shown in FIG. 1, it is understood that such components can be connected to network 103, 105 thereby making them accessible to integrity enforcer 102.

In one embodiment, API user/API provider trustworthiness assessor 204 utilizes natural language processing in examining changelogs and social media content to determine any changes in business ownership. For example, the current business owner of API user 101/API provider 104 may be stored in a data structure (e.g., table) that was populated by an expert. In one embodiment, such a data structure is stored in the storage device (e.g., memory, disk unit) of integrity enforcer 102. In one embodiment, API user/API provider trustworthiness assessor 204 utilizes natural language processing to search and identify any changes in the current business ownership of API user 101/API provider 104 (obtained from the data structure discussed above) by performing a search on the Internet (e.g., repositories, social media websites) for any changes in the current business ownership. If any business ownership changes are detected, then API user 101/API provider 104 may be deemed to be less trustworthy.

"Changes in code ownership," as used herein, refer to changes in the ownership of the code utilized by API user 101/API provider 104. Such information may be obtained by API user/API provider trustworthiness assessor 204 examining changelogs. In another example, such information may be obtained by API user/API provider trustworthiness assessor 204 examining social media content. In one embodiment, such changelogs and social media content may be stored in publicly available repositories, websites (e.g., social media websites), etc. on the Internet. In one embodiment, changelogs and social media content may be examined by API user/API provider trustworthiness assessor 204 accessing publicly available repositories, websites (e.g., social media websites), etc. on the Internet, which may be accessible via network 103, 105.

In one embodiment, API user/API provider trustworthiness assessor 204 utilizes natural language processing in examining changelogs and social media content to determine any changes in code ownership. For example, the current code owner of API user 101/API provider 104 may be stored in a data structure (e.g., table) that was populated by an expert. In one embodiment, such a data structure is stored in the storage device (e.g., memory, disk unit) of integrity enforcer 102. In one embodiment, API user/API provider trustworthiness assessor 204 may utilize natural language processing to search and identify any changes in the current code ownership of API user 101/API provider 104 (obtained from the data structure discussed above) by performing a search on the Internet (e.g., repositories, social media websites) for any changes in the current code ownership. If any code ownership changes are detected, then API user 101/API provider 104 may be deemed to be less trustworthy.

"Changes in API specifications," as used herein, refer to changes in an API specification, which corresponds to a document or standard that describes how to build or use the connection, such as the connection between API user 101 and API provider 104. Such information may be obtained by API user/API provider trustworthiness assessor 204 examining changelogs. In another example, such information may be obtained by API user/API provider trustworthiness assessor 204 examining social media content. In one embodiment, such changelogs and social media content may be stored in publicly available repositories, websites (e.g., social media websites), etc. on the Internet. In one embodiment, changelogs and social media content may be examined by API user/API provider trustworthiness assessor 204 accessing publicly available repositories, websites (e.g., social media websites), etc. on the Internet, which may be accessible via network 103, 105.

In one embodiment, API user/API provider trustworthiness assessor 204 utilizes natural language processing in examining changelogs and social media content to determine any changes in the API specifications. For example, the current API specification pertaining to the connection between API user 101 and API provider 104 may be stored in a data structure (e.g., table) that was populated by an expert. In one embodiment, such a data structure is stored in the storage device (e.g., memory, disk unit) of integrity enforcer 102. In one embodiment, API user/API provider trustworthiness assessor 204 utilizes natural language processing to search and identify any changes in the API specification (obtained from the data structure discussed above) by performing a search on the Internet (e.g., repositories, social media websites) for any changes in the API specification. If any changes to the API specification are detected, then API user 101/API provider 104 may be deemed to be less trustworthy.

API user/API provider trustworthiness assessor 204 monitors the established connection between API user 101 and API provider 104 to assess the trustworthiness of API user 101/API provider 104, such as via the examples discussed above, using various software tools, including, but not limited to, SolarWinds® Network Performance Monitor, Datadag® Network Monitoring, ManageEngine® OpManager, Paessler® PRTG Network Monitor, Auvik®, Nagios® XI, Zabbix®, LogicMonitor®, OP5®, Splunk®, NetXMS, etc.

The discussion above provided examples of API user/API provider trustworthiness assessor 204 monitoring the established connection between API user 101 and API provider 104 to assess the trustworthiness of API user 101/API provider 104. In one embodiment, API user/API provider trustworthiness assessor 204 generates a value to indicate a lack of trustworthiness, including the extent or risk of untrustworthiness. In one embodiment, such a value may correspond to a value between a range of values, such as between 0 and 10, in which the higher value indicates a higher risk of API user 101/API provider 104 untrustworthiness. In one embodiment, API user/API provider trustworthiness assessor 204 generates a value for each factor (e.g., determining whether certificate pinning is implemented, determining whether an encryption downgrade was accepted) that was used in assessing the API user 101/API provider 104 trustworthiness that represents the extent or risk of API user 101/API provider 104 untrustworthiness.

In one embodiment, the value generated by API user/API provider trustworthiness assessor 204 for each factor (e.g., determining whether leaked content is discovered, determining the lifetime remaining on a certificate) that was used in assessing API user 101/API provider 104 untrustworthiness is compared to a predefined threshold value, which may represent different levels of risk, such as, for example, low, medium, high and extreme levels of risk. In one embodiment, such predefined levels of threshold are populated by an expert. In one embodiment, the values (generated by API user/API provider trustworthiness assessor 204) of 1-3 correspond to a low level of risk, the values (generated by API user/API provider trustworthiness assessor 204) of 3.1-5 correspond to a medium level of risk, the values (generated by API user/API provider trustworthiness assessor 204) of 5.1-10 correspond to a high level of risk and values (generated by API user/API provider trustworthiness assessor 204) greater than 10 correspond to an extreme level of risk.

The services performed by connection security assessor 202, connection trustworthiness assessor 203 and API user/API provider trustworthiness assessor 204 discussed above may be classified as providing three main services: compliance auditing, breach detection and trust monitoring.

In one embodiment, the target of the services may be a single party (e.g., API user 101) or multiple parties (e.g., API user 101 and API provider 104 or simply multiple endpoint users, such as multiple API users 101). While the following discusses that the target of the services is both API user 101 and API provider 104, it is noted that the principles of the present disclosure is not to be limited in such a manner and that the target of the services may simply be one of these parties. A person of ordinary skill in the art would be capable of applying the principles of the present disclosure to such implementations. Further, embodiments applying the principles of the present disclosure to such implementations would fall within the scope of the present disclosure.

Integrity enforcer 102 further includes a risk analyzer engine 205 configured to generate a final level of risk of an API attack with respect to API user 101 and/or API provider 104 based on the identified levels of risk for each factor generated by connection security assessor 202, connection trustworthiness assessor 203 and API user/API provider trustworthiness assessor 204.

In one embodiment, risk analyzer engine 205 generates a final level of risk (e.g., medium, high) of an API attack with respect to API user 101 and/or API provider 104 based on the levels of risk generated by connection security assessor 202, connection trustworthiness assessor 203 and API user/API provider trustworthiness assessor 204 for various factors used in assessing the connection security and trustworthiness of the connection as well as the trustworthiness of API user 101 and/or API producer 104. For example, if any of these factors resulted in having a risk of extreme, then the resulting (or final) level of risk is extreme. If one of the factors used in assessing the connection security and trustworthiness of the connection as well as the trustworthiness of API user 101 and/or API producer 104 is high, then the resulting (or final) level of risk is high. If multiple factors used in assessing the connection security and trustworthiness of the connection as well as the trustworthiness of API user 101 and/or API producer 104 is high, then the resulting (or final) level of risk is extreme. If, however, none of the factors used in assessing the connection security and trustworthiness of the connection as well as the trustworthiness of API user 101 and/or API producer 104 is high or extreme, then the overall resulting (or final) level of risk is the highest level of risk found in one of the factors.

Additionally, integrity enforcer 102 includes an action performer engine 206 configured to visually display an indication of a level of risk of the API attack based on the final level of risk generated by risk analyzer engine 205. For example, the action may include an automatic intervention when the final level of risk is deemed to be an extreme risk. Such an automatic intervention may include blocking traffic or throttling traffic. Other examples include feeding bogus data to the requester of information being sent across the established connection between API user 101 and API provider 104. In one embodiment, such bogus data is coded in such a manner that it will self-delete or destruct.

In another example, when the final level of risk is high, the action may include denying the request, such as a request for data that is being transmitted over the established connection, until the risk level is reduced to a safer level. In a further example, when the final level of risk is high, the action may include diverting all the data being sent on the established connection to a sandbox or a honeypot for further analysis. A "sandbox" is an isolated environment on a network that mimics end-user operating environments. Sandboxes are used to safely execute suspicious code without risking harm to the host device or network. A "honeypot" is a network-attached system used as a trap for cyber-attackers to detect and study the tricks and types of attacks used by hackers.

In a further example, when the final level of risk is medium, the action may include a message (e.g., instant message, email message) being sent to an appropriate software developer regarding the final level of risk being medium and to maintain watch for a change in the level of risk.

A further description of these and other functions is provided below in connection with the discussion of the method for protecting against API attacks.

Prior to the discussion of the method for protecting against API attacks, a description of the hardware configuration of integrity enforcer 102 (FIG. 1) is provided below in connection with FIG. 3.

Figure 3:
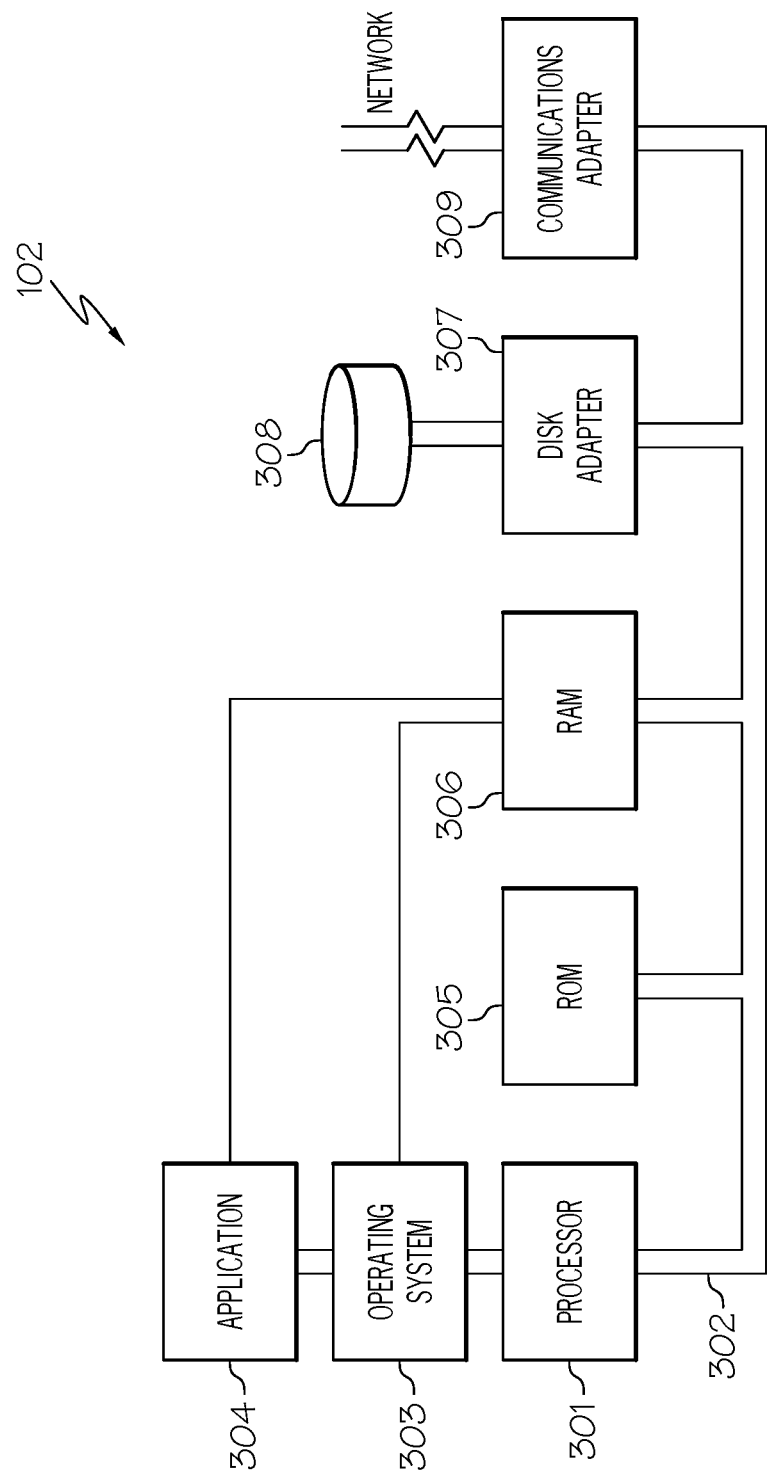
FIG. 3 illustrates an embodiment of the present disclosure of the hardware configuration of the integrity enforcer which is representative of a hardware environment for practicing the present disclosure.

Referring now to FIG. 3, FIG. 3 illustrates an embodiment of the present disclosure of the hardware configuration of integrity enforcer 102 (FIG. 1) which is representative of a hardware environment for practicing the present disclosure.

Integrity enforcer 102 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, connection establisher engine 201 (FIG. 2), connection security assessor 202 (FIG. 2), connection trustworthiness assessor 203 (FIG. 2), API user/API provider trustworthiness assessor 204 (FIG. 2), risk analyzer engine 205 (FIG. 2) and action performer engine 206 (FIG. 2). Furthermore, application 304 may include, for example, a program for protecting against API attacks as discussed further below in connection with FIGS. 4-6.

Referring again to FIG. 3, read-only memory ("ROM") 305 is connected to system bus 302 and includes a basic input/output system ("BIOS") that controls certain basic functions of integrity enforcer 102. Random access memory ("RAM") 306 and disk adapter 307 are also connected to system bus 302. It should be noted that software components including operating system 303 and application 304 may be loaded into RAM 306, which may be integrity enforcer's 102 main memory for execution. Disk adapter 307 may be an integrated drive electronics ("IDE") adapter that communicates with a disk unit 308, e.g., disk drive. It is noted that the program for protecting against API attacks, as discussed further below in connection with FIGS. 4-6, may reside in disk unit 308 or in application 304.

Integrity enforcer 102 may further include a communications adapter 309 connected to bus 302. Communications adapter 309 interconnects bus 302 with an outside network (e.g., networks 103, 105 of FIG. 1) to communicate with other devices, such as API user 101 and API provider 104 of FIG. 1.

In one embodiment, application 304 of integrity enforcer 102 includes the software components of connection establisher engine 201, connection security assessor 202, connection trustworthiness assessor 203, API user/API provider trustworthiness assessor 204, risk analyzer engine 205 and action performer engine 206. In one embodiment, such components may be implemented in hardware, where such hardware components would be connected to bus 302. The functions discussed above performed by such components are not generic computer functions. As a result, integrity enforcer 102 is a particular machine that is the result of implementing specific, non-generic computer functions.

In one embodiment, the functionality of such software components (e.g., establisher engine 201, connection security assessor 202, connection trustworthiness assessor 203, API user/API provider trustworthiness assessor 204, risk analyzer engine 205 and action performer engine 206) of integrity enforcer 102, including the functionality for protecting against API attacks, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, APIs, unfortunately, are susceptible to different types of attacks. An API attack is a hostile usage or attempted hostile usage of an API. There are various ways that attackers can abuse an API endpoint, such as injection attacks, denial of service attacks, man in the middle attacks, etc. An "API abuse," as used herein, refers to the misuse of API functions to either carry out malicious activities (e.g., using the API to raid servers) or to send numerous requests to a computing device (e.g., server) to waste bandwidth. With respect to the exemplary API attacks listed above, injection attacks occur when malicious code is embedded into unsecured software. In a denial of service (DoS) attack, the attacker attempts to make the targeted system unavailable to its intended users. In the API man in the middle attack, the attacker intercepts communications between an API endpoint and a client. The attacker steals and/or alters the confidential data that is passed between them. Attempts have been made to detect and protect against such API attacks, such as having APIs enforce authentication and authorization, encrypting traffic using transport layer security (TLS), removing information that is not meant to be shared, etc. Unfortunately, such attempts have failed to detect and protect against such API attacks.

Figure 4:
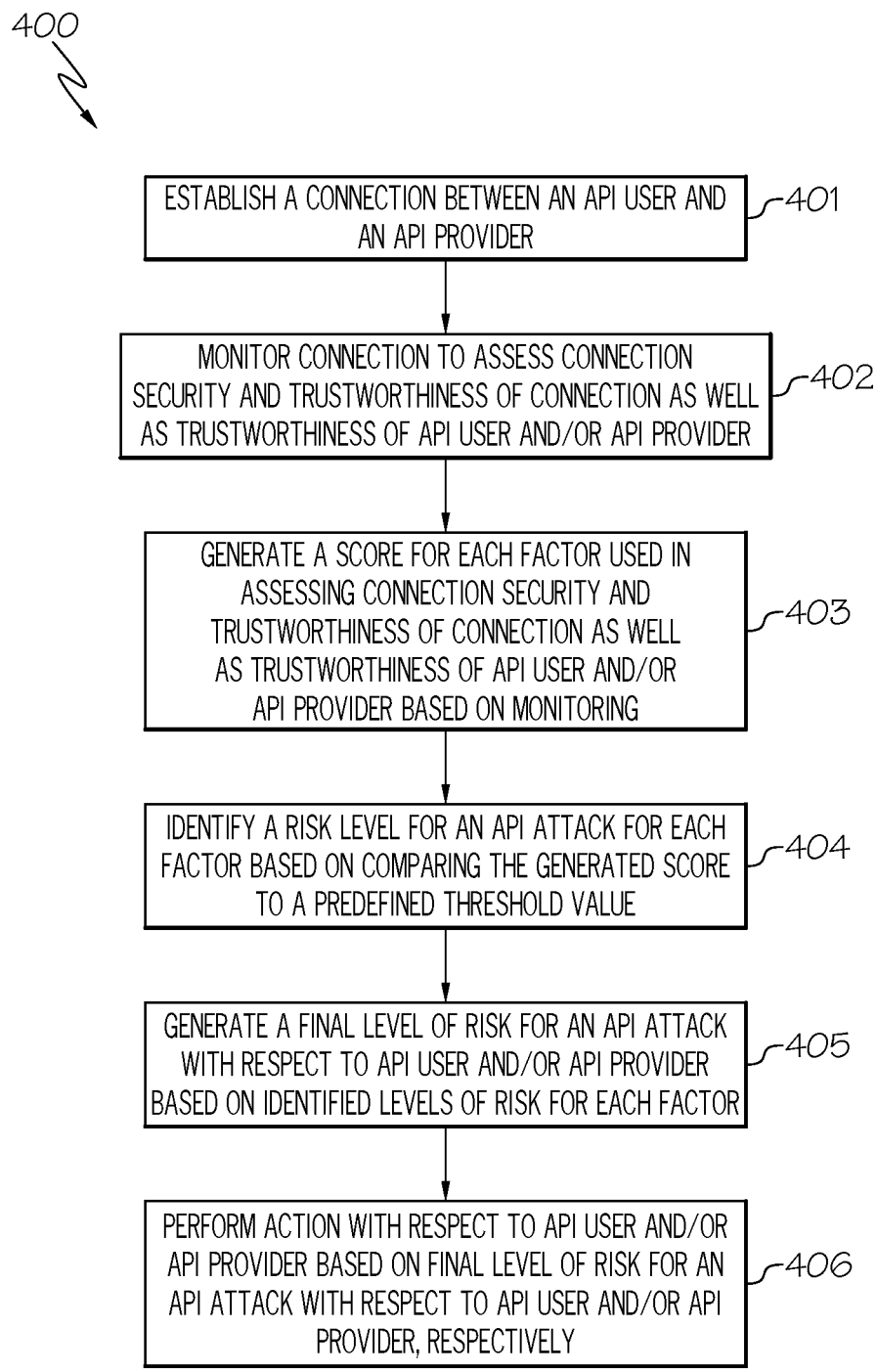
FIG. 4 is a flowchart of a method for protecting against API attacks in accordance with an embodiment of the present disclosure.
Figure 6:
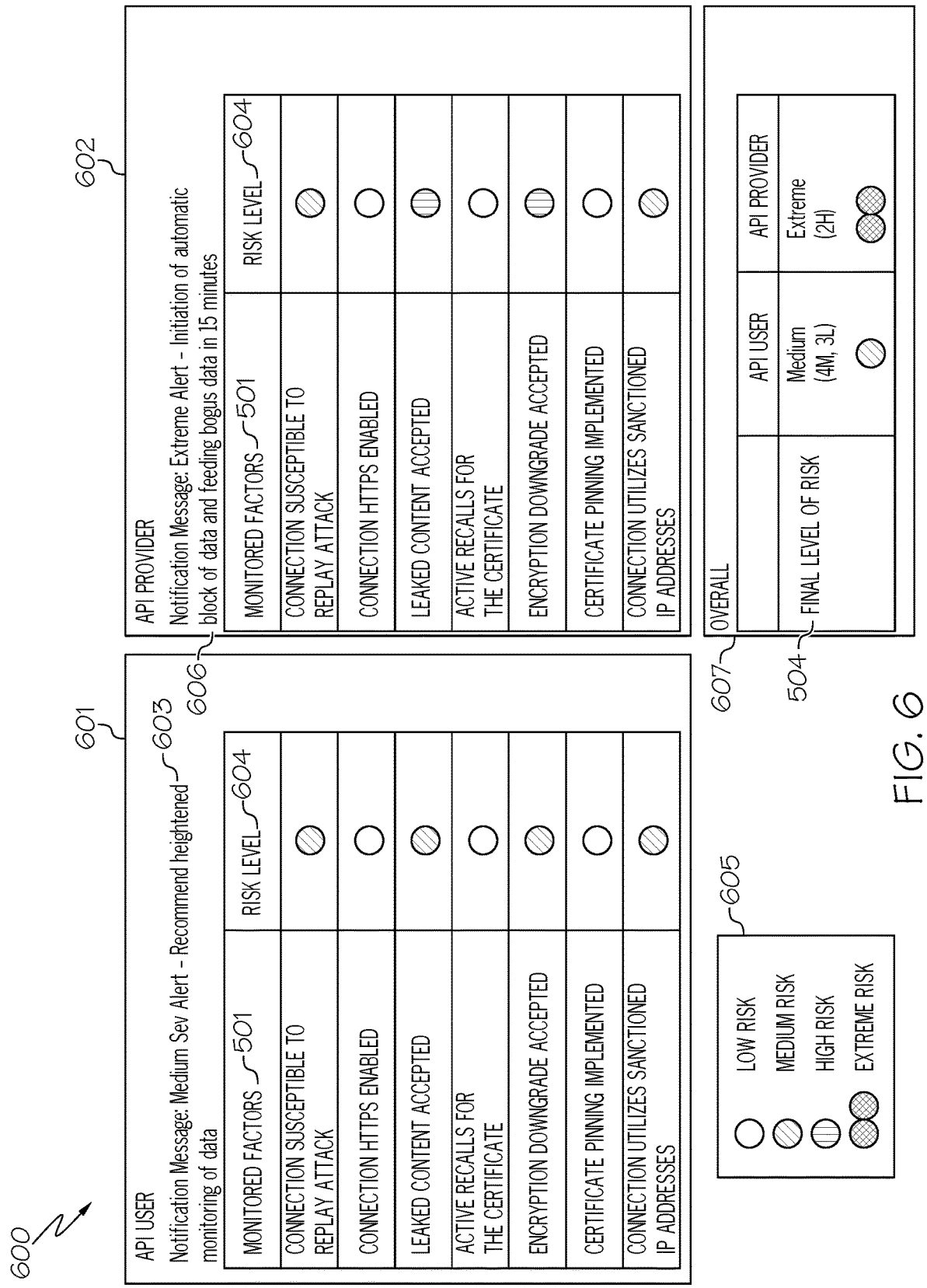
FIG. 6 is an exemplary illustration of a dashboard providing notifications to an end user pertaining to the level of risk of an API attack for the API user and the API provider in accordance with an embodiment of the present disclosure.

The embodiments of the present disclosure provide a means for detecting and protecting against API attacks (e.g., injection attacks, denial of services attacks, man in the middle attacks, etc.) by continuously auditing the security compliance of the API usage relationship between the API provider and the API user as discussed below in connection with FIGS. 4-6. FIG. 4 is a flowchart of a method for protecting against API attacks. FIG. 5 is an exemplary illustration of compiling the findings from various monitored aspects concerning the risk for an API attack. FIG. 6 is an exemplary illustration of a dashboard providing notifications to an end user pertaining to the level of risk of an API attack for the API user and the API provider.

As stated above, FIG. 4 is a flowchart of a method 400 for protecting against API attacks in accordance with an embodiment of the present disclosure.

As previously discussed, while the following discusses that the target of the services (compliance auditing, breach detection and trust monitoring) is both API user 101 and API provider 104, it is noted that the principles of the present disclosure is not to be limited in such a manner and that the target of the services may simply be one of these parties. A person of ordinary skill in the art would be capable of applying the principles of the present disclosure to such implementations. Further, embodiments applying the principles of the present disclosure to such implementations would fall within the scope of the present disclosure.

Referring to FIG. 4, in conjunction with FIGS. 1-3, in step 401, connection establisher engine 201 of integrity enforcer 102 establishes a connection between API user 101 and API provider 104.

As discussed above, in one embodiment, connection establisher engine 201 establishes such a connection by obtaining an API key, which is a unique identifier used to authenticate API user 101. In one embodiment, connection establisher engine 201 obtains such an API key from API provider 104. In one embodiment, the API key includes a string of letters and numbers that identify API user 101. A request to establish a connection between API user 101 and API provider 104 is then sent by connection establisher engine 201 to the endpoint of API provider 104 along with the API key to authenticate the request. In one embodiment, the API key is stored in the header of the request. An "endpoint," as used herein, refers to one end of a communication channel.

In one embodiment, upon authentication, API provider 104 enables a connection to be established by connection establisher engine 201 between API provider 104 (endpoint of API provider 104) and API user 101 (endpoint of API user 101).

In step 402, connection security assessor 202, connection trustworthiness assessor 203 and API user/API provider trustworthiness assessor 204 of integrity enforcer 102 monitor the established connection in real-time to assess connection security and trustworthiness of the connection as well as the trustworthiness of API user 101 and/or API provider 104.

As discussed above, "connection security," as used herein, refers to the securing of information sent between API user 101 and API provider 104 over the established connection. "Trustworthiness," as used herein, refers to an attribute of the established connection, API user 101 or API provider 104 that provides confidence that such connections, API users 101 or API providers 104 have the capabilities and reliability to perform specific tasks and fulfill assigned responsibilities, such as the connection being able to properly transmit information between API user 101 and API provider 104 and API user 101/API provider 104 being able to properly send or receive information transmitted over the established connection.

In one embodiment, connection security assessor 202 monitors the established connection between API user 101 and API provider 104 to assess the connection security, such as by determining whether the connection has a minimum transport layer security standard enforced, determining whether a session is valid after a session timeout, determining whether the security handling of session cookies is proper, determining whether the security handling of parameters is proper, determining whether the established connection utilizes sanctioned Internet Protocol (IP) addresses, determining whether API user 101 or API provider 104 is located within a user-designated geographic area, determining whether the connection to API user 101/API provider 104 is hosted by a user-designated platform provider, determining whether the connection is hypertext transfer protocol (HTTPS) enabled, determining whether the certificate (electronic credentials that bind the identity of the certificate owner to a pair of electronic encryption keys, (one public and one private), that can be used to encrypt and sign information digitally) used in establishing a trusted relationship between API user 101 and API provider 104 is a trusted non-expired certificate, determining whether the connection is susceptible to a replay attack, such as a replay of authentication credentials (e.g., password) by not tagging each encrypted component with a session identifier and a component number, assessing the traffic routing or quality of service for the established connection, verifying that the hosting has been set-up properly by analyzing the S3 buckets (object storage service) using various software tools, such as Access Analyzer for S3, etc.

As further discussed above, connection security assessor 202 monitors the established connection between API user 101 and API provider 104 to assess the connection security, such as via the examples discussed above, using various software tools, including, but not limited to, SolarWinds® Network Insights, Paessler® PRTG, ManageEngine® OpManager, Negios XI, Zenoss®, Icinga® 2, Wireshark®, Network Mapper®, Nessus®, QualysGuard®, Core Impact®, Nikto, PowerSploit, etc.

Furthermore, as discussed above, in one embodiment, connection trustworthiness assessor 203 monitors the established connection between API user 101 and API provider 104 to assess the trustworthiness of the connection, such as by determining the lifetime remaining on a certificate, determining if there are any active recalls for the certificate, determining whether leaked content is discovered, etc.

Additionally, as stated above, connection trustworthiness assessor 203 monitors the established connection between API user 101 and API provider 104 to assess the trustworthiness of the connection, such as via the examples discussed above, using various software tools, including, but not limited to, SolarWinds® Network Performance Monitor, Datadag® Network Monitoring, ManageEngine® OpManager, Paessler® PRTG Network Monitor, Auvik®, Nagios® XI, Zabbix®, LogicMonitor®, OP5®, Splunk®, NetXMS, etc.

Furthermore, as discussed above, in one embodiment, API user/API provider trustworthiness assessor 204 monitors the established connection between API user 101 and API provider 104 to assess the trustworthiness of API user 101/API provider 104, such as by determining whether certificate pinning is implemented, determining whether an encryption downgrade is accepted, determining whether a connection from a new host is accepted, determining whether changes in servers or protocol versions are accepted during the session, determining whether the session is properly terminated after timeout, determining changes in business ownership, changes in code ownership, and changes in API specifications, etc.

Additionally, as stated above, API user/API provider trustworthiness assessor 204 monitors the established connection between API user 101 and API provider 104 to assess the trustworthiness of API user 101/API provider 104, such as via the examples discussed above, using various software tools, including, but not limited to, SolarWinds® Network Performance Monitor, Datadag® Network Monitoring, ManageEngine® OpManager, Paessler® PRTG Network Monitor, Auvik®, Nagios® XI, Zabbix®, LogicMonitor®, OP5®, Splunk®, NetXMS, etc.

In step 403, connection security assessor 202, connection trustworthiness assessor 203 and API user/API provider trustworthiness assessor 204 of integrity enforcer 102 generate a score for each factor used in assessing the connection security and trustworthiness of the connection as well as the trustworthiness of API user 101 and/or API provider 104 indicating a level of risk of an API attack based on the monitoring.

As discussed above, in one embodiment, connection security assessor 202 generates a value to indicate a lack of connection security, including the extent or risk of connection insecurity. In one embodiment, such a value may correspond to a value between a range of values, such as between 0 and 10, in which the higher value indicates a higher risk of connection insecurity. In one embodiment, connection security assessor 202 generates a value for each factor (e.g., determining whether a session is valid after a session timeout, determining whether the connection has a minimum transport layer security standard enforced) that was used in assessing the connection security that represents the extent or risk of connection insecurity.

Furthermore, as discussed above, in one embodiment, connection trustworthiness assessor 203 generates a value to indicate a lack of trustworthiness, including the extent or risk of untrustworthiness. In one embodiment, such a value may correspond to a value between a range of values, such as between 0 and 10, in which the higher value indicates a higher risk of connection untrustworthiness. In one embodiment, connection trustworthiness assessor 203 generates a value for each factor (e.g., determining whether leaked content is discovered, determining the lifetime remaining on a certificate) that was used in assessing the connection trustworthiness that represents the extent or risk of connection untrustworthiness.

Additionally, as discussed above, in one embodiment, API user/API provider trustworthiness assessor 204 generates a value to indicate a lack of trustworthiness, including the extent or risk of untrustworthiness. In one embodiment, such a value may correspond to a value between a range of values, such as between 0 and 10, in which the higher value indicates a higher risk of API user 101/API provider 104 untrustworthiness. In one embodiment, API user/API provider trustworthiness assessor 204 generates a value for each factor (e.g., determining whether certificate pinning is implemented, determining whether an encryption downgrade was accepted) that was used in assessing the API user 101/API provider 104 trustworthiness that represents the extent or risk of API user 101/API provider 104 untrustworthiness.

In step 404, connection security assessor 202, connection trustworthiness assessor 203 and API user/API provider trustworthiness assessor 204 of integrity enforcer 102 identify a risk level for each factor based on comparing the generated score to a predefined threshold value.

As discussed above, in one embodiment, the value generated by connection security assessor 202 for each factor (e.g., determining whether a session is valid after a session timeout, determining whether the connection has a minimum transport layer security standard enforced) that was used in assessing the connection security is compared to a predefined threshold value, which may represent different levels of risk, such as, for example, low, medium, high and extreme levels of risk. In one embodiment, such predefined levels of threshold are populated by an expert. In one embodiment, the values (generated by connection security assessor 202) of 1-3 correspond to a low level of risk, the values (generated by connection security assessor 202) of 3.1-5 correspond to a medium level of risk, the values (generated by connection security assessor 202) of 5.1-10 correspond to a high level of risk and values (generated by connection security assessor 202) greater than 10 correspond to an extreme level of risk.

Furthermore, as discussed above, in one embodiment, the value generated by connection trustworthiness assessor 203 for each factor (e.g., determining whether leaked content is discovered, determining the lifetime remaining on a certificate) that was used in assessing the connection untrustworthiness is compared to a predefined threshold value, which may represent different levels of risk, such as, for example, low, medium, high and extreme levels of risk. In one embodiment, such predefined levels of threshold are populated by an expert. In one embodiment, the values (generated by connection trustworthiness assessor 203) of 1-3 correspond to a low level of risk, the values (generated by connection trustworthiness assessor 203) of 3.1-5 correspond to a medium level of risk, the values (generated by connection trustworthiness assessor 203) of 5.1-10 correspond to a high level of risk and values (generated by connection trustworthiness assessor 203) greater than 10 correspond to an extreme level of risk.

Additionally, as discussed above, in one embodiment, the value generated by API user/API provider trustworthiness assessor 204 for each factor (e.g., determining whether leaked content is discovered, determining the lifetime remaining on a certificate) that was used in assessing API user 101/API provider 104 untrustworthiness is compared to a predefined threshold value, which may represent different levels of risk, such as, for example, low, medium, high and extreme levels of risk. In one embodiment, such predefined levels of threshold are populated by an expert. In one embodiment, the values (generated by API user/API provider trustworthiness assessor 204) of 1-3 correspond to a low level of risk, the values (generated by API user/API provider trustworthiness assessor 204) of 3.1-5 correspond to a medium level of risk, the values (generated by API user/API provider trustworthiness assessor 204) of 5.1-10 correspond to a high level of risk and values (generated by API user/API provider trustworthiness assessor 204) greater than 10 correspond to an extreme level of risk.

An illustration of such scores being generated by connection security assessor 202, connection trustworthiness assessor 203 and API user/API provider trustworthiness assessor 204, where risk levels are assigned to such scores, is provided in FIG. 5.

FIG. 5 is an exemplary illustration of compiling the findings from various monitored aspects concerning the risk for an API attack in accordance with an embodiment of the present disclosure.

Referring to FIG. 5, in conjunction with FIG. 1, FIG. 5 illustrates a data structure (table) 500 that stores a listing of various factors 501 monitored by connection security assessor 202, connection trustworthiness assessor 203 and API user/API provider trustworthiness assessor 204 used in connection with determining the risk for an API attack in connection with API user 101 and/or API provider 104. In one embodiment, such a data structure 500 is stored in the storage device (e.g., memory 305, disk unit 308) of integrity enforcer 102. As discussed above, connection security assessor 202, connection trustworthiness assessor 203 and API user/API provider trustworthiness assessor 204 generate a value for each factor used in connection with determining the risk for an API attack with respect to API user 101 (as shown in column 502) and API provider 104 (as shown in column 503). Such a score may then be compared to a predefined threshold value, which may represent different levels of risk, such as, for example, low, medium, high and extreme levels of risk. In one embodiment, such predefined levels of threshold are populated by an expert. In one embodiment, the values (generated by connection security assessor 202, connection trustworthiness assessor 203, API user/API provider trustworthiness assessor 204) of 1-3 correspond to a low level of risk, the values (generated by connection security assessor 202, connection trustworthiness assessor 203, API user/API provider trustworthiness assessor 204) of 3.1-5 correspond to a medium level of risk, the values (generated by connection security assessor 202, connection trustworthiness assessor 203, API user/API provider trustworthiness assessor 204) of 5.1-10 correspond to a high level of risk and values (generated by connection security assessor 202, connection trustworthiness assessor 203, API user/API provider trustworthiness assessor 204) greater than 10 correspond to an extreme level of risk.

For example, connection security assessor 202 monitors the established connection between API user 101 and API provider 104 to assess the connection security by determining whether the connection is susceptible to a replay attack as shown in FIG. 5. For instance, connection security assessor 202 may determine that some, but not all, of the encrypted components are tagged with a session identifier and a component number. As an example, fewer encrypted components for API provider 104 may be tagged with a session identifier and a component than for API user 101. As a result, connection security assessor 202 may assign a score of 5 (resulting in a medium level of risk) for API provider 104 and a score of 3.1 (resulting in a medium level of risk) for API user 101 as shown in FIG. 5.

In another example, connection security assessor 202 monitors the established connection between API user 101 and API provider 104 to assess the connection security by determining whether the connection is HTTPS enabled as shown in FIG. 5. If, for instance, the connection is HTTPS enabled for both API user 101 and API provider 104, then connection security assessor may assign a score of 2 (resulting in a low level of risk) for both API user 101 and API provider 104 as shown in FIG. 5.

In a further example, connection trustworthiness assessor 203 monitors the established connection between API user 101 and API provider 104 to assess the connection trustworthiness by determining whether leaked content is discovered as shown in FIG. 5. For instance, connection trustworthiness assessor 203 may have determined that a portion of the content communicated on the established connection between API user 101 and API provider 104 was leaked with respect to both API user 101 and API provider 104, where a greater portion of the content may have been leaked with respect to API provider 104. As a result, connection trustworthiness assessor 203 may assign a score of 6 (resulting in a high level of risk) for API provider 104 and a score of 5 (resulting in a medium level of risk) for API user 101 as shown in FIG. 5.

In another example, connection trustworthiness assessor 203 monitors the established connection between API user 101 and API provider 104 to assess the connection trustworthiness by determining if there are any active recalls for the certificate as shown in FIG. 5. For instance, connection trustworthiness assessor 203 may not have detected any active recalls for the certificate. As a result, connection trustworthiness assessor 203 may assign a score of 1 (resulting in a low level of risk) for both API user 101 and API provider 104 as shown in FIG. 5.

In a further example, API user/API provider trustworthiness assessor 204 monitors the established connection between API user 101 and API provider 104 to assess the trustworthiness of API user 101/API provider 104 by determining whether an encryption downgrade is accepted. For instance, API user/API provider trustworthiness assessor 204 may determine that API user 101 accepted a minor encryption downgrade by accepting a slightly older protocol than the current version; whereas, API provider 104 accepted a more extensive encryption downgrade by accepting a much older protocol than the current version. As a result, API user/API provider trustworthiness assessor 204 may assign a score of 5 (resulting in a medium level of risk) for API user 101 and a score of 7 (resulting in a high level of risk) for API provider 104 as shown in FIG. 5.

In another example, API user/API provider trustworthiness assessor 204 monitors the established connection between API user 101 and API provider 104 to assess the trustworthiness of API user 101/API provider 104 by determining whether certificate pinning is implemented as shown in FIG. 5. For instance, API user/API provider trustworthiness assessor 204 may determine that certificate pinning is implemented with respect to both API user 101 and API provider 104. As a result, API user/API provider trustworthiness assessor 204 may assign a score of 0 (resulting in a low level of risk) for both API user 101 and API provider 104 as shown in FIG. 5.

In a further example, connection security assessor 202 monitors the established connection between API user 101 and API provider 104 to assess the connection security by determining whether the connection utilizes sanctioned IP addresses. If connection security assessor 202 determines that there is a close match (not an exact match) of the IP address of the API user 101 and API provider 104 to an IP address listed in the list of sanctioned IP addresses, in which the IP address of API provider 104 is a closer match to an IP address in such a list than the IP address of API user 101, then API user/API provider trustworthiness assessor 204 may assign a score of 4 (resulting in a medium level of risk) for API user 101 and a score of 5 (resulting in a medium level of risk) for API provider 104 as shown in FIG. 5.

Returning to FIG. 4, in conjunction with FIGS. 1-3 and 5, in step 405, risk analyzer engine 205 of integrity enforcer 102 generates a final level of risk for an API attack with respect to API user 101 and/or API provider 104 based on the identified levels of risk for each factor that was used in assessing the level of risk of an API attack.

As discussed above, risk analyzer engine 205 generates a final level of risk (e.g., medium, high) of an API attack with respect to API user 101 and/or API provider 104 based on the levels of risk generated by connection security assessor 202, connection trustworthiness assessor 203 and API user/API provider trustworthiness assessor 204 for various factors used in assessing the connection security and trustworthiness of the connection as well as the trustworthiness of API user 101 and/or API producer 104. For example, if any of these factors resulted in having a risk level of extreme, then the resulting (or final) level of risk is extreme. If one of the factors used in assessing the connection security and trustworthiness of the connection as well as trustworthiness of API user 101 and/or API producer 104 is assigned the risk level of high, then the resulting (or final) level of risk is high. If multiple factors used in assessing the connection security and trustworthiness of the connection as well as the trustworthiness of API user 101 and/or API producer 104 is assigned the risk level of high, then the resulting (or final) level of risk is extreme. If, however, none of the factors used in assessing the connection security and trustworthiness of the connection as well as the trustworthiness of API user 101 and/or API producer 104 is assigned the risk level of high or extreme, then the overall resulting (or final) level of risk is assigned the highest level of risk found in one of the factors.

For example, referring to FIG. 5, the final level of risk of an API attack (see element 504) with respect to API user 101 is medium; whereas, the final level of risk of an API attack (see element 504) with respect to API provider 104 is extreme.

As shown in FIG. 5, with respect to API user 101, none of the factors were assigned a risk level of high or extreme. Instead, there were 3 factors assigned a low risk (identified as "3L" in FIG. 5) and 4 factors assigned a medium risk (identified as "4M" in FIG. 5). Consequently, the overall final level of risk of an API attack with respect to API user 101 using the example embodiment discussed above (if none of the factors used in assessing the connection security and trustworthiness of the connection as well as the trustworthiness of API user 101 and/or API producer 104 is assigned the risk level of high or extreme, then the overall resulting (or final) level of risk is assigned the highest level of risk found in one of the factors) is medium.

Furthermore, as shown in FIG. 5, with respect to API provider 104, two of the factors were assigned a risk level of high (identified as "2H" in FIG. 5). Consequently, the overall final level of risk of an API attack with respect to API provider 104 using the example embodiment discussed above (if multiple factors used in assessing the connection security and trustworthiness of the connection as well as the trustworthiness of API user 101 and/or API producer 104 is assigned the risk level of high, then the resulting (or final) level of risk is extreme) is extreme.

Returning to FIG. 4, in conjunction with FIGS. 1-3 and 5, in step 406, action performer engine 206 of integrity enforcer 102 performs an action with respect to API user 101 and/or API provider 104 based on the final level of risk for an API attack with respect to API user 101 and/or API provider 104, respectively, generated by risk analyzer engine 205.

As discussed above, in one embodiment, action performer engine 206 is configured to visually display an indication of a level of risk of the API attack based on the final level of risk generated by risk analyzer engine 205. For example, the action may include an automatic intervention when the final level of risk is deemed to be an extreme risk. Such an automatic intervention may include blocking traffic or throttling traffic. Other examples include feeding bogus data to the requester of information being sent across the established connection between API user 101 and API provider 104. In one embodiment, such bogus data is coded in such a manner that it will self-delete or destruct.

In another example, when the final level of risk is high, the action may include denying the request, such as a request for data that is being transmitted over the established connection, until the risk level is reduced to a safer level. In a further example, when the final level of risk is high, the action may include diverting all the data being sent on the established connection to a sandbox or a honeypot for further analysis. A "sandbox" is an isolated environment on a network that mimics end-user operating environments. Sandboxes are used to safely execute suspicious code without risking harm to the host device or network. A "honeypot" is a network-attached system used as a trap for cyber-attackers to detect and study the tricks and types of attacks used by hackers.

In a further example, when the final level of risk is medium, the action may include a message (e.g., instant message, email message) being sent to an appropriate software developer regarding the final level of risk being medium and to maintain watch for a change in the level of risk.

An illustration of action performer engine 206 visually displaying an indication of a level of risk of the API attack based on the final level of risk generated by risk analyzer engine 205 is shown in FIG. 6.

FIG. 6 is an exemplary illustration of a dashboard providing notifications to an end user pertaining to the level of risk of an API attack for API user 101 (FIG. 1) and API provider 104 (FIG. 1) in accordance with an embodiment of the present disclosure.

Referring to FIG. 6, in conjunction with FIGS. 1, 4 and 5, dashboard 600 includes a message board 601 for API user 101 and a message board 602 for API provider 104. Message board 601 for API user 101 includes a notification message 603 which indicates the final level of risk (medium) and the recommended action for such a level of risk (e.g., recommend heightened monitoring of data). Furthermore, as shown in message board 601, message board 601 includes a listing of the monitored factors 501 for API user 101 as shown in FIG. 5 along with the corresponding risk level 604 for an API attack with respect to API user 101 (see element 502 of FIG. 5), where the corresponding risk level 604 is displayed to the user via a color-coded or shaded circle, where each color or shade corresponds to a particular risk level as shown in legend 605. It is noted that other indications for the risk level 604 may be represented in dashboard 600 and that the principles of the present disclosure are not to be limited to such indications as shown in FIG. 6.

Furthermore, as shown in FIG. 6, message board 602 for API provider 104 includes a notification message 606 which indicates the final level of risk (extreme) and the recommended action for such a level of risk (e.g., initiation of automatic block of data and feeding bogus data to requester). Furthermore, as shown in notification message 606 of message board 602, such an action will occur in 15 minutes. Additionally, as shown in message board 602, message board 602 includes a listing of the monitored factors 501 for API provider 104 as shown in FIG. 5 along with the corresponding risk level 604 for an API attack with respect to API provider 104 (see element 503 of FIG. 5), where the corresponding risk level 604 is displayed to the user via a color-coded or shaded circle, where each color or shade corresponds to a particular risk level as shown in legend 605. It is noted that other indications for the risk level 604 may be represented in dashboard 600 and that the principles of the present disclosure are not to be limited to such indications as shown in FIG. 6.

Additionally, as shown in dashboard 600, the final level of risk 504 of an API attack with respect to API user 101 and API provider 104 as determined by risk analyzer engine 205 is visually displayed to the end user in summary 607.

In this manner, embodiments of the present disclosure provide a means for detecting and protecting against API attacks (e.g., injection attacks, denial of services attacks, man in the middle attacks, etc.) by continuously auditing the security compliance of the API usage relationship between the API provider and the API user. Such auditing of the security compliance of the API-usage relationship is through monitoring externally verifiable behaviors and detecting if a party shows signs of a breach, security or trust issue. Embodiments of the present disclosure protect against API attacks by remediating or containing such an issue once detected.

Furthermore, the principles of the present disclosure improve the technology or technical field involving application programming interface (API) attacks. As discussed above, APIs, unfortunately, are susceptible to different types of attacks. An API attack is a hostile usage or attempted hostile usage of an API. There are various ways that attackers can abuse an API endpoint, such as injection attacks, denial of service attacks, man in the middle attacks, etc. An "API abuse," as used herein, refers to the misuse of API functions to either carry out malicious activities (e.g., using the API to raid servers) or to send numerous requests to a computing device (e.g., server) to waste bandwidth. With respect to the exemplary API attacks listed above, injection attacks occur when malicious code is embedded into unsecured software. In a denial of service (DoS) attack, the attacker attempts to make the targeted system unavailable to its intended users. In the API man in the middle attack, the attacker intercepts communications between an API endpoint and a client. The attacker steals and/or alters the confidential data that is passed between them. Attempts have been made to detect and protect against such API attacks, such as having APIs enforce authentication and authorization, encrypting traffic using transport layer security (TLS), removing information that is not meant to be shared, etc. Unfortunately, such attempts have failed to detect and protect against such API attacks.

Embodiments of the present disclosure improve such technology by establishing a connection between an API user and an API provider. The established connection is then monitored in real-time to assess connection security and trustworthiness of the connection as well as the trustworthiness of the API user and/or the API provider. A score is then generated for each factor (e.g., determining whether the connection has a minimum transport layer security standard enforced, determining whether an encryption downgrade is accepted) used in assessing the connection security and the trustworthiness of the connection as well as the trustworthiness of the API user and/or the API provider based on the monitoring to indicate connection insecurity, untrustworthiness of the connection, untrustworthiness of the API user or untrustworthiness of the API provider. The score assigned to each these factors is then compared to a predefined threshold value to identify a risk level for an API attack with respect to the API user or the API provider. For example, the score assigned to a factor may be compared to a predefined threshold value, which may represent different levels of risk, such as, for example, low, medium, high and extreme levels of risk. A "final" level of risk for an API attack with respect to the API user and/or the API provider is then generated based on these identified levels of risk for an API attack for each of these factors. An action (e.g., blocking traffic, throttling traffic) is then performed with respect to the API user and/or the API provider based on the final level of risk for an API attack with respect to the API user and/or the API provider, respectively. In this manner, embodiments of the present disclosure detect and protect against API attacks (e.g., injection attacks, denial of services attacks, man in the middle attacks, etc.) by continuously auditing the security compliance of the API usage relationship between the API user and the API provider. Furthermore, in this manner, there is an improvement in the technical field involving application programming interface (API) attacks.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for protecting against application programming interface (API) attacks, the method comprising:
   establishing a connection between an API user and an API provider;
   monitoring said connection to assess connection security and trustworthiness of said connection as well as trustworthiness of one or more of said API user and said API provider;
   generating a score for each factor used in assessing said connection security and said trustworthiness of said connection as well as said trustworthiness of one or more of said API user and said API provider based on said monitoring to indicate connection insecurity, untrustworthiness of said connection, untrustworthiness of said API user or untrustworthiness of said API provider;
   generating a level of risk for an API attack with respect to one or more of said API user and said API provider based on said generated score for each factor used in assessing said connection security and said trustworthiness of said connection as well as said trustworthiness of one or more of said API user and said API provider; and
   performing an action with respect to one or more of said API user and said API provider based on said level of risk for said API attack with respect to one or more of said API user and said API provider, respectively.

2. The method as recited in claim 1 further comprises:
identifying a risk level for said API attack for each factor used in assessing said connection security and said trustworthiness of said connection as well as said trustworthiness of one or more of said API user and said API provider based on comparing said score to a predefined threshold value; and
generating said level of risk for said API attack with respect to one or more of said API user and said API provider based on said identified risk level for said API attack for each factor used in assessing said connection security and said trustworthiness of said connection as well as said trustworthiness of one or more of said API user and said API provider.

3. The method as recited in claim 1, wherein said connection security is assessed by determining one or more of the following: whether said connection has a minimum transport layer security standard enforced, whether a session is valid after a session timeout, proper security handling of session cookies, proper security handling of parameters, whether said connection utilizes sanctioned Internet Protocol (IP) addresses, whether said API user or said API provider is located within a user-designated geographic area, and whether said connection to said API user or said API provider is hosted by a user-designated platform provider.

4. The method as recited in claim 1, wherein said trustworthiness of said connection is assessed by determining one or more of the following: lifetime remaining on a certificate, active recalls for said certificate and whether leaked content is discovered.

5. The method as recited in claim 1, wherein said trustworthiness of one or more of said API provider and said API user is assessed by determining one or more of the following: whether certificate pinning is implemented, whether an encryption downgrade is accepted, whether a connection from a new host is accepted, whether changes in servers or protocol versions are accepted during a session, whether said session is properly terminated after timeout, changes in business ownership, changes in code ownership, and changes in certifications.

6. The method as recited in claim 1, wherein said action comprises visually displaying an indication of said level of risk for said API attack.

7. The method as recited in claim 1, wherein said action comprises an automatic intervention, wherein said automatic intervention comprises blocking traffic or throttling of traffic.

8. A computer program product for protecting against application programming interface (API) attacks, the computer program product comprising one or more computer readable storage mediums having program code embodied therewith, the program code comprising programming instructions for:
establishing a connection between an API user and an API provider;
monitoring said connection to assess connection security and trustworthiness of said connection as well as trustworthiness of one or more of said API user and said API provider;
generating a score for each factor used in assessing said connection security and said trustworthiness of said connection as well as said trustworthiness of one or more of said API user and said API provider based on said monitoring to indicate connection insecurity, untrustworthiness of said connection, untrustworthiness of said API user or untrustworthiness of said API provider;
generating a level of risk for an API attack with respect to one or more of said API user and said API provider based on said generated score for each factor used in assessing said connection security and said trustworthiness of said connection as well as said trustworthiness of one or more of said API user and said API provider; and
performing an action with respect to one or more of said API user and said API provider based on said level of risk for said API attack with respect to one or more of said API user and said API provider, respectively.

9. The computer program product as recited in claim 8, wherein the program code further comprises the programming instructions for:
identifying a risk level for said API attack for each factor used in assessing said connection security and said trustworthiness of said connection as well as said trustworthiness of one or more of said API user and said API provider based on comparing said score to a predefined threshold value; and
generating said level of risk for said API attack with respect to one or more of said API user and said API provider based on said identified risk level for said API attack for each factor used in assessing said connection security and said trustworthiness of said connection as well as said trustworthiness of one or more of said API user and said API provider.

10. The computer program product as recited in claim 8, wherein said connection security is assessed by determining one or more of the following: whether said connection has a minimum transport layer security standard enforced, whether a session is valid after a session timeout, proper security handling of session cookies, proper security handling of parameters, whether said connection utilizes sanctioned Internet Protocol (IP) addresses, whether said API user or said API provider is located within a user-designated geographic area, and whether said connection to said API user or said API provider is hosted by a user-designated platform provider.

11. The computer program product as recited in claim 8, wherein said trustworthiness of said connection is assessed by determining one or more of the following: lifetime remaining on a certificate, active recalls for said certificate and whether leaked content is discovered.

12. The computer program product as recited in claim 8, wherein said trustworthiness of one or more of said API provider and said API user is assessed by determining one or more of the following: whether certificate pinning is implemented, whether an encryption downgrade is accepted, whether a connection from a new host is accepted, whether changes in servers or protocol versions are accepted during a session, whether said session is properly terminated after timeout, changes in business ownership, changes in code ownership, and changes in certifications.

13. The computer program product as recited in claim 8, wherein said action comprises visually displaying an indication of said level of risk for said API attack.

14. The computer program product as recited in claim 8, wherein said action comprises an automatic intervention, wherein said automatic intervention comprises blocking traffic or throttling of traffic.

15. A system, comprising:
a memory for storing a computer program for protecting against application programming interface (API) attacks; and a processor connected to said memory, wherein said processor is configured to execute program instructions of the computer program comprising:

establishing a connection between an API user and an API provider;

monitoring said connection to assess connection security and trustworthiness of said connection as well as trustworthiness of one or more of said API user and said API provider;

generating a score for each factor used in assessing said connection security and said trustworthiness of said connection as well as said trustworthiness of one or more of said API user and said API provider based on said monitoring to indicate connection insecurity, untrustworthiness of said connection, untrustworthiness of said API user or untrustworthiness of said API provider;

generating a level of risk for an API attack with respect to one or more of said API user and said API provider based on said generated score for each factor used in assessing said connection security and said trustworthiness of said connection as well as said trustworthiness of one or more of said API user and said API provider; and performing an action with respect to one or more of said API user and said API provider based on said level of risk for said API attack with respect to one or more of said API user and said API provider, respectively.

16. The system as recited in claim 15, wherein the program instructions of the computer program further comprise:

identifying a risk level for said API attack for each factor used in assessing said connection security and said trustworthiness of said connection as well as said trustworthiness of one or more of said API user and said API provider based on comparing said score to a predefined threshold value; and generating said level of risk for said API attack with respect to one or more of said API user and said API provider based on said identified risk level for said API attack for each factor used in assessing said connection security and said trustworthiness of said connection as well as said trustworthiness of one or more of said API user and said API provider.

17. The system as recited in claim 15, wherein said connection security is assessed by determining one or more of the following: whether said connection has a minimum transport layer security standard enforced, whether a session is valid after a session timeout, proper security handling of session cookies, proper security handling of parameters, whether said connection utilizes sanctioned Internet Protocol (IP) addresses, whether said API user or said API provider is located within a user-designated geographic area, and whether said connection to said API user or said API provider is hosted by a user-designated platform provider.

18. The system as recited in claim 15, wherein said trustworthiness of said connection is assessed by determining one or more of the following: lifetime remaining on a certificate, active recalls for said certificate and whether leaked content is discovered.

19. The system as recited in claim 15, wherein said trustworthiness of one or more of said API provider and said API user is assessed by determining one or more of the following: whether certificate pinning is implemented, whether an encryption downgrade is accepted, whether a connection from a new host is accepted, whether changes in servers or protocol versions are accepted during a session, whether said session is properly terminated after timeout, changes in business ownership, changes in code ownership, and changes in certifications.

20. The system as recited in claim 15, wherein said action comprises visually displaying an indication of said level of risk for said API attack.

* * * * *